Sept. 20, 1938. A. MARCHEV ET AL 2,130,962
DUPLICATING MACHINE
Filed April 1, 1937 11 Sheets-Sheet 1
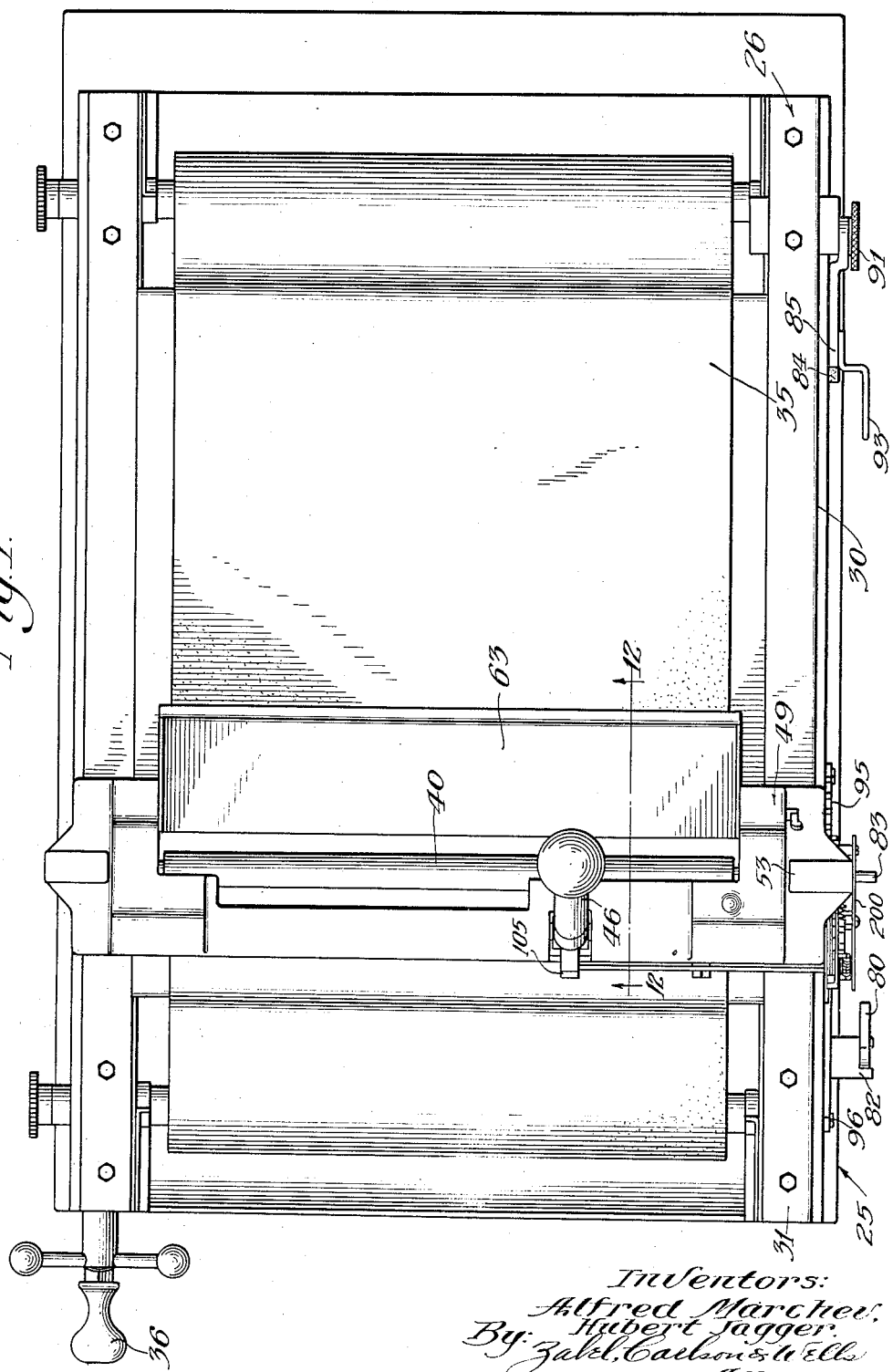

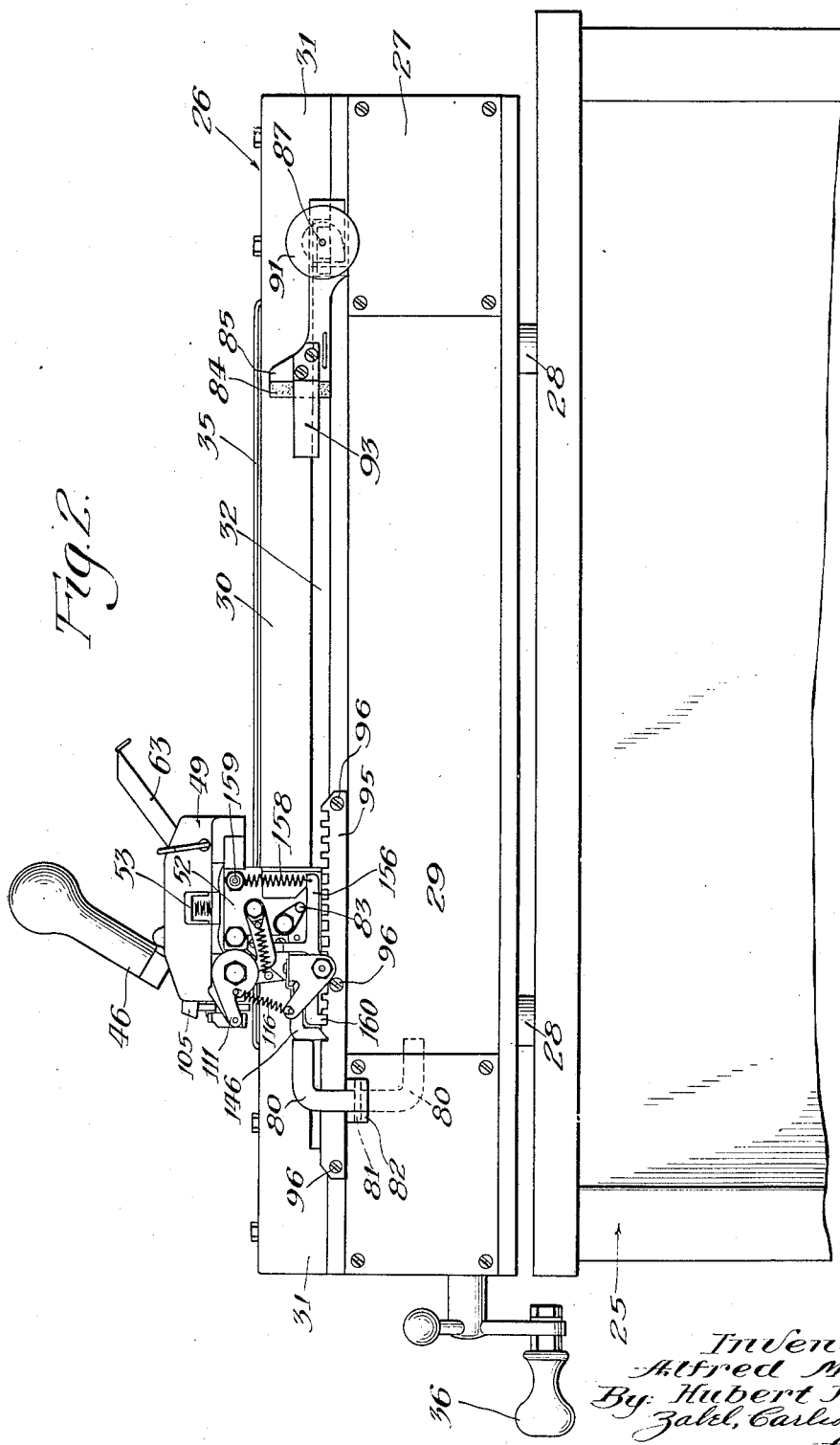

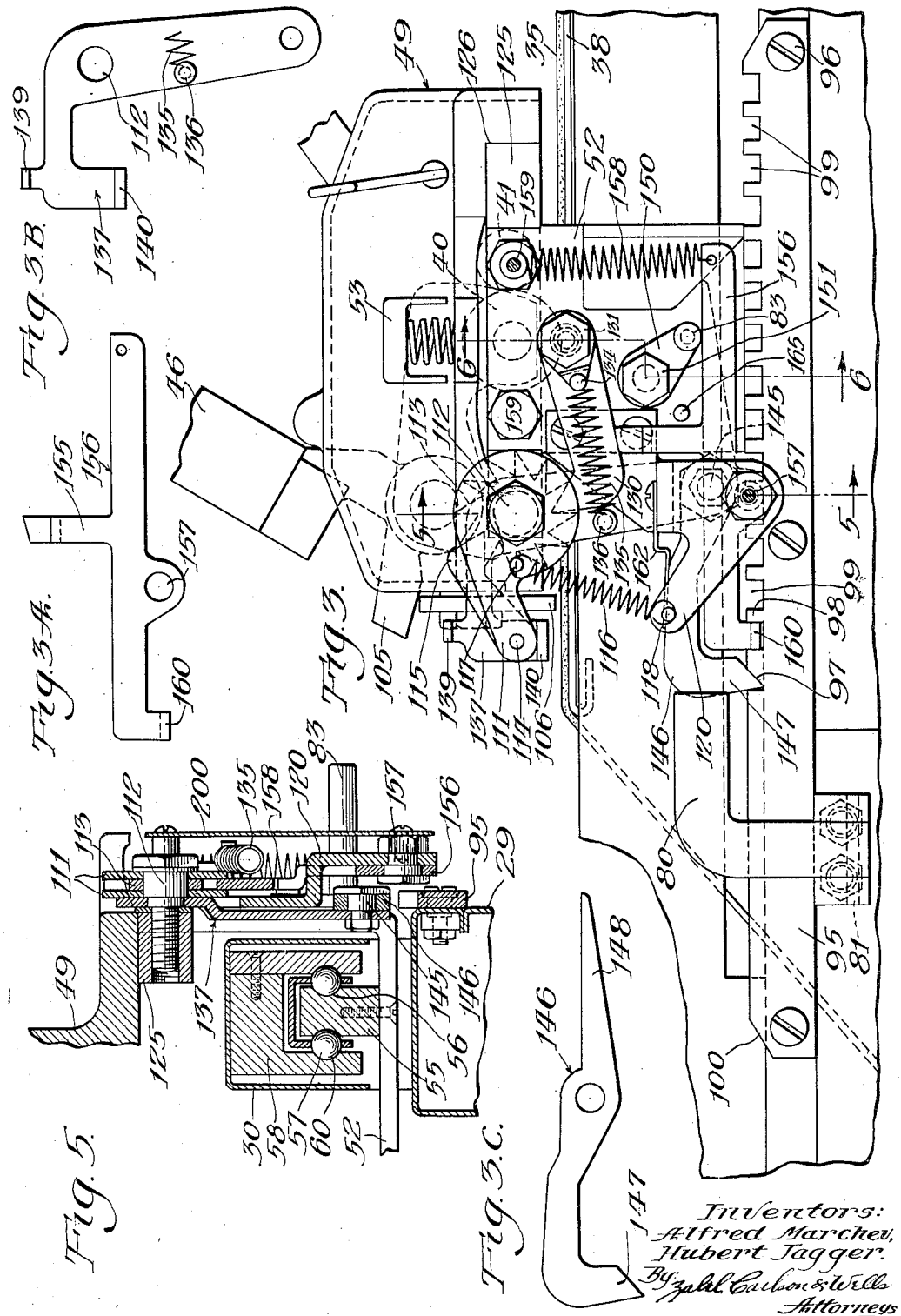

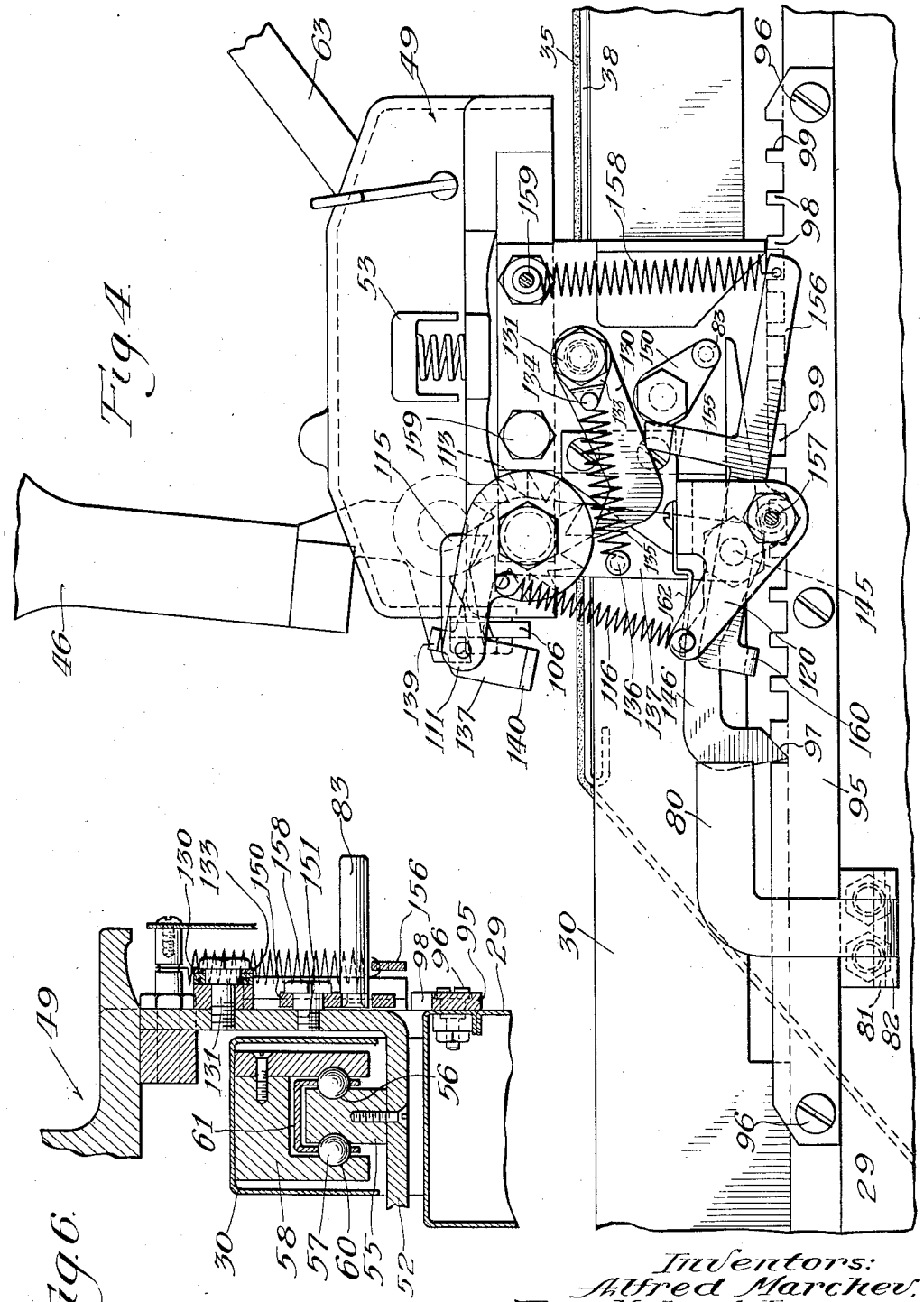

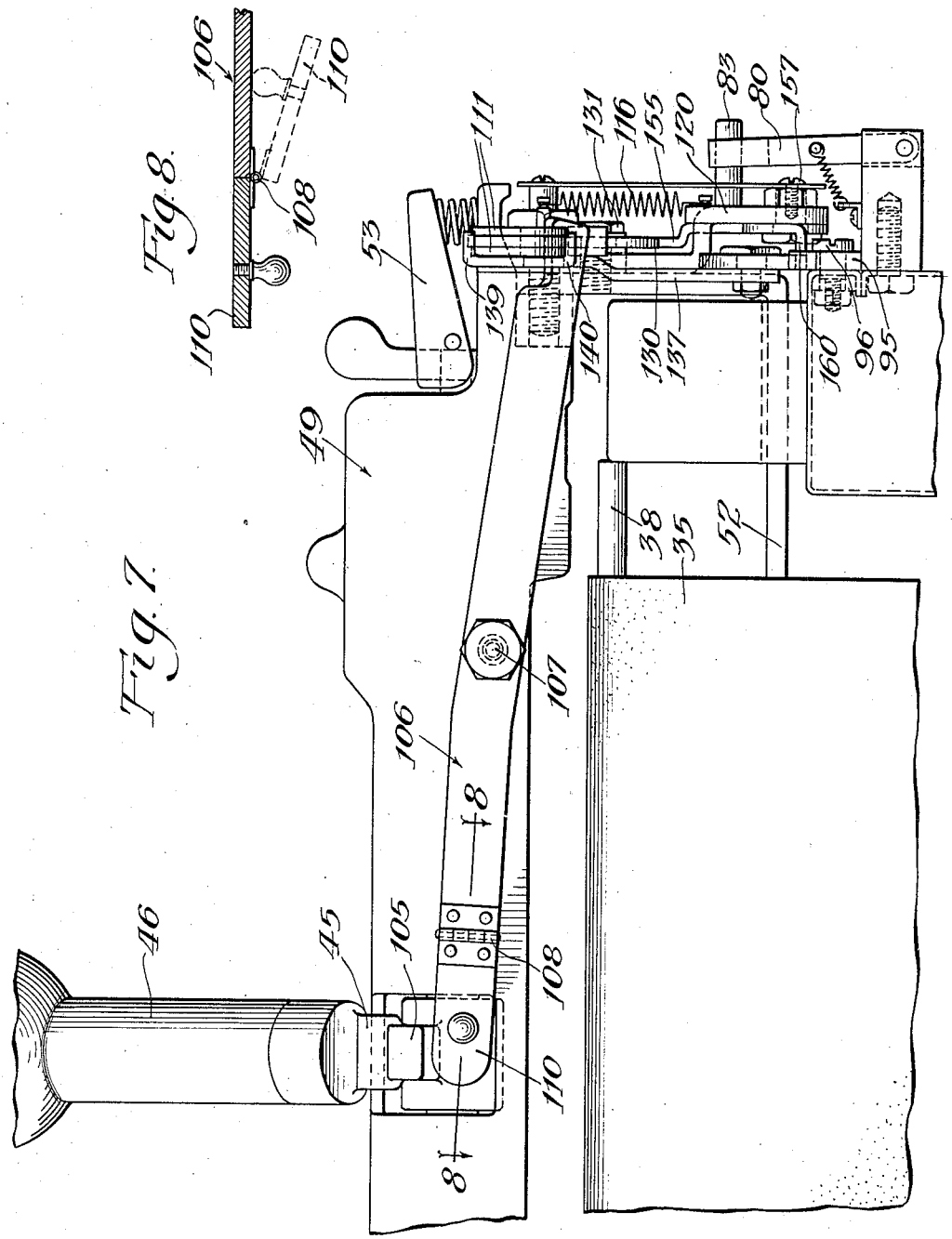

Sept. 20, 1938.  A. MARCHEV ET AL  2,130,962
DUPLICATING MACHINE
Filed April 1, 1937   11 Sheets-Sheet 6
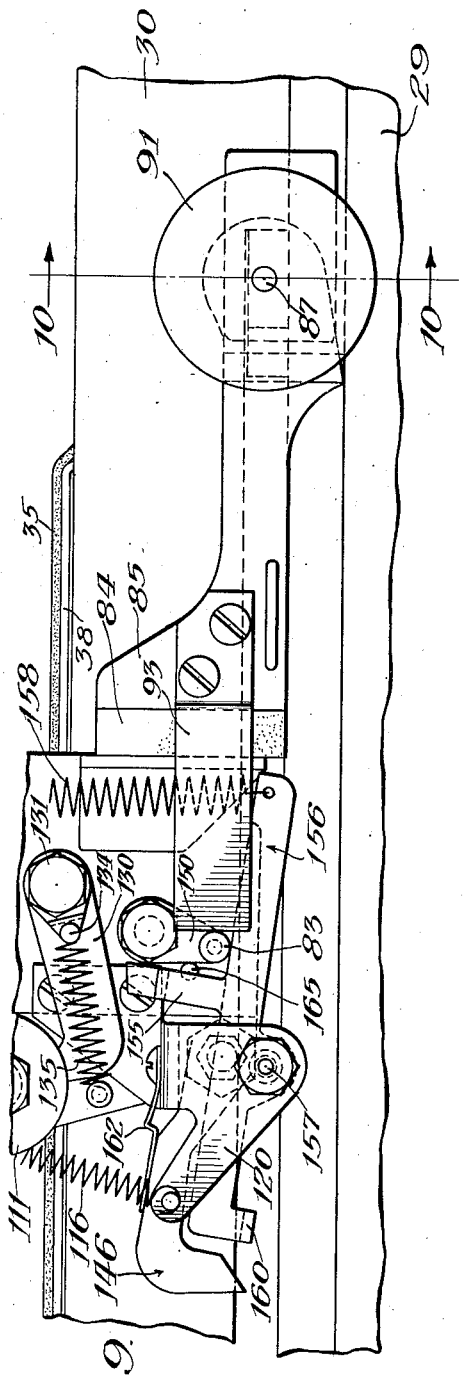
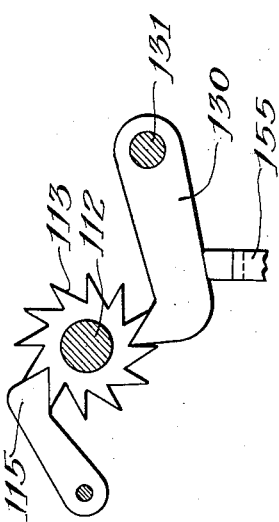
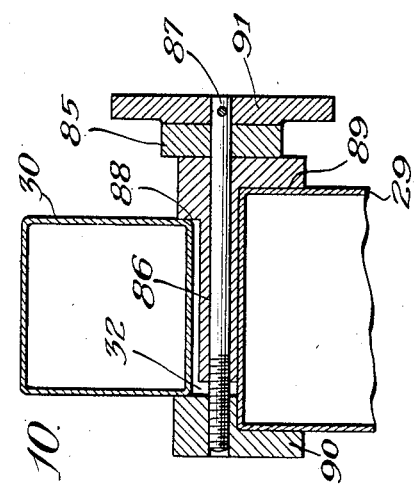
Inventors:
Alfred Marchev,
Hubert Jagger,
By Zabel, Carlson & Wells,
Attorneys Sept. 20, 1938.  A. MARCHEV ET AL  2,130,962
DUPLICATING MACHINE
Filed April 1, 1937  11 Sheets-Sheet 7
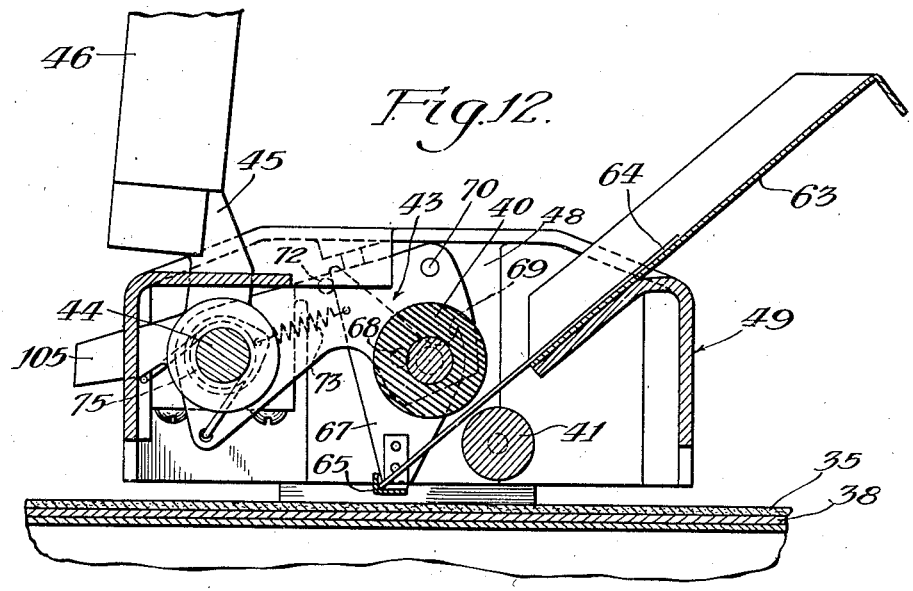
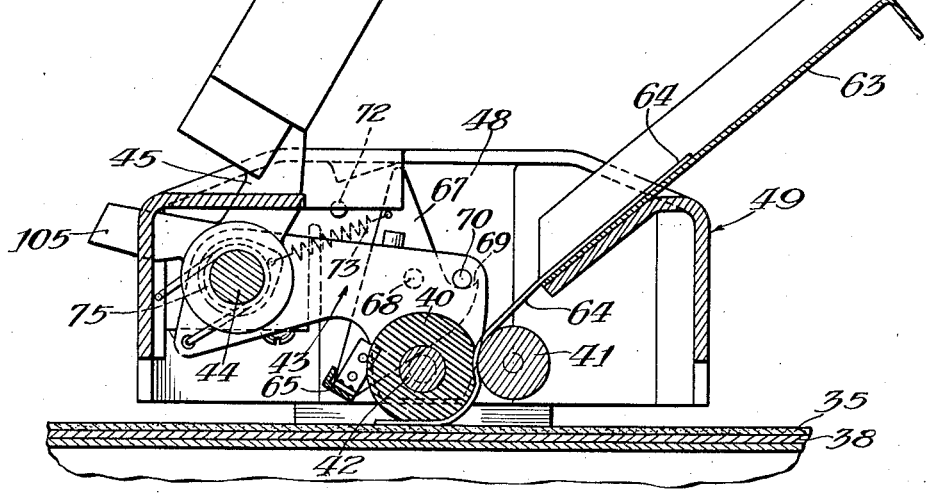

Fig. 14.

| EMPLOYEE'S REGISTRATION NUMBER | EMPLOYEE'S NAME | HOURS WORKED | EARNINGS | DEDUCTIONS | | | NET PAY | FULL TIME | HOURS LOST | CAUSE | DATE LOST TIME BEGAN | SHIFT |
|---|---|---|---|---|---|---|---|---|---|---|---|---|
| | | | | FOAR | UC | MISC | | | | | | |
| 1234 | J. Smith | 40 | 22.00 | 2.00 | | | 20.00 | | | | | |
| 2689 | H. L. Jones | 38 | 25.00 | | | | 25.00 | | | | | |
| 3294 | James Brown | 40 | 29.00 | | | 1.00 | 28.00 | | | | | |
| 1689 | M. H. Keil | 35 | 18.00 | | | | 18.00 | | | | | |
| 378 | L. Hurst | 39 | 30.00 | | | | 30.00 | | | | | |
| 2001 | A. Walker | 35 | 15.00 | 5.00 | | | 10.00 | | | | | |
| 2453 | J. Hamlin | 40 | 50.00 | | 5.00 | | 45.00 | | | | | |
| 1243 | L. Wyse | 36 | 35.00 | | | 1.00 | 34.00 | | | | | |
| 2345 | James Key | 40 | 34.00 | 4.00 | | | 30.00 | | | | | |
| 3556 | S. Kral | 44 | 48.00 | 2.00 | | | 46.00 | | | | | |
| 4567 | F. Fischer | 40 | 18.00 | | | 3.00 | 15.00 | | | | | |
| 5678 | B. G. Parke | 39 | 19.00 | | | | 19.00 | | | | | |
| 7890 | P. James | 36 | 20.00 | 2.00 | | | 18.00 | | | | | |

PAYROLL
WEEK ENDED _____ 1936
DEPT. _____

Fig. 15.

1234  J. Smith  40  22.00  2.00  20.00

Inventors:
Alfred Marchev,
Hubert Jagger
By Zabel, Carlson & Wells
Attorneys:

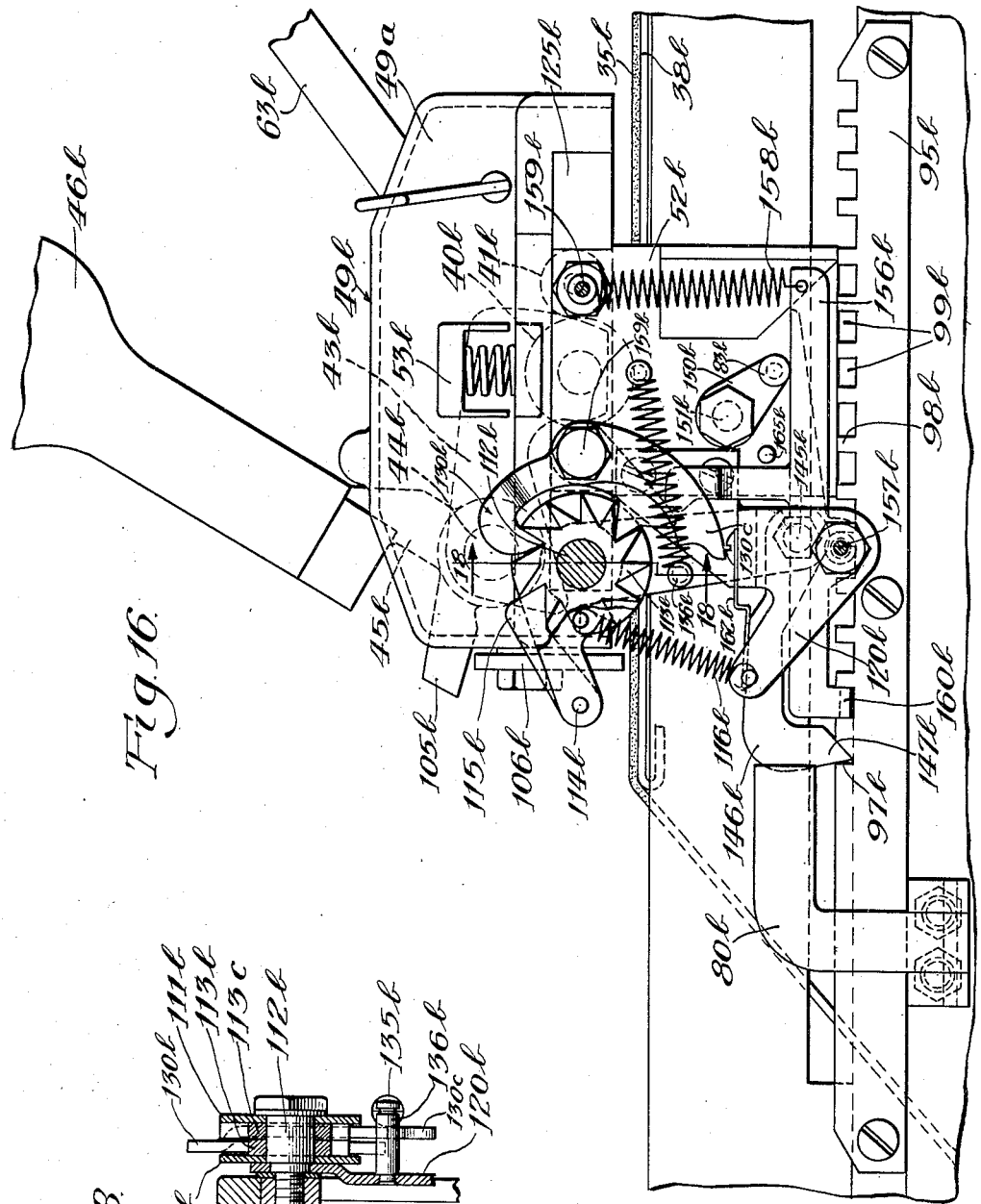

Sept. 20, 1938.   A. MARCHEV ET AL   2,130,962
DUPLICATING MACHINE
Filed April 1, 1937   11 Sheets-Sheet 10
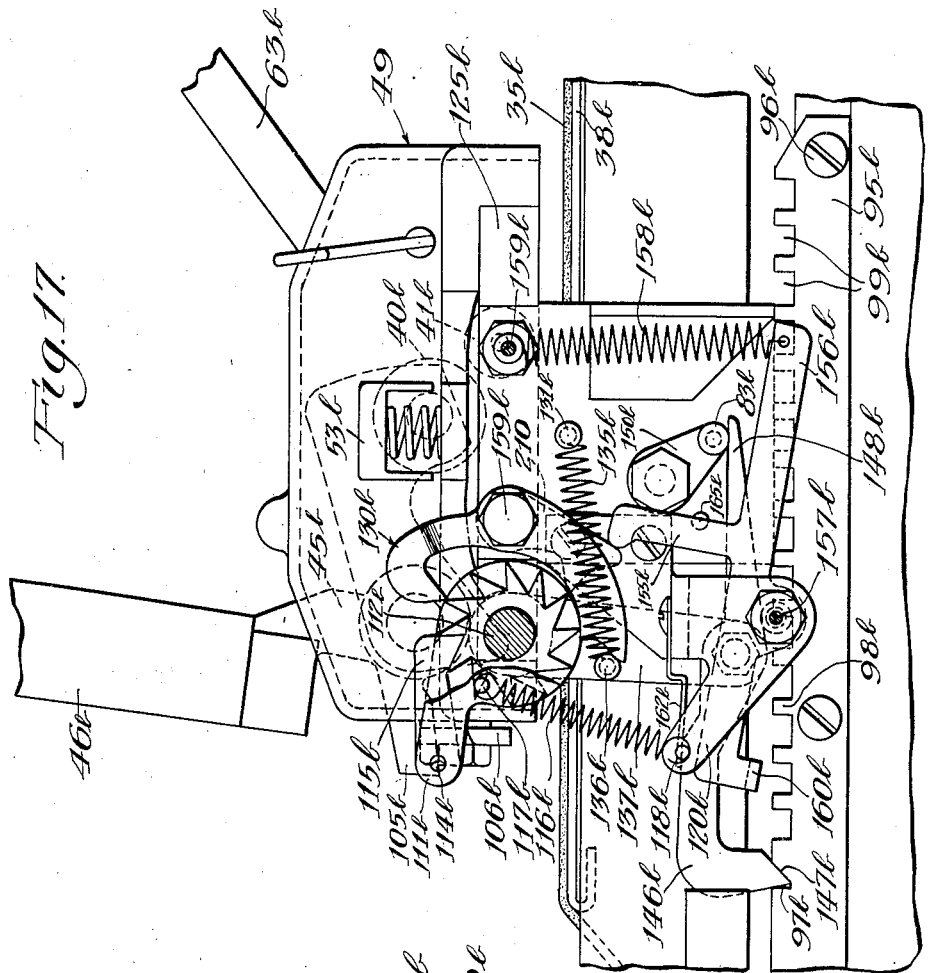
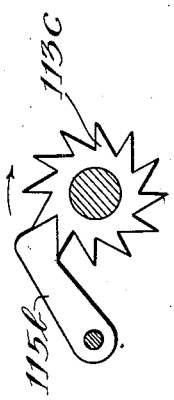

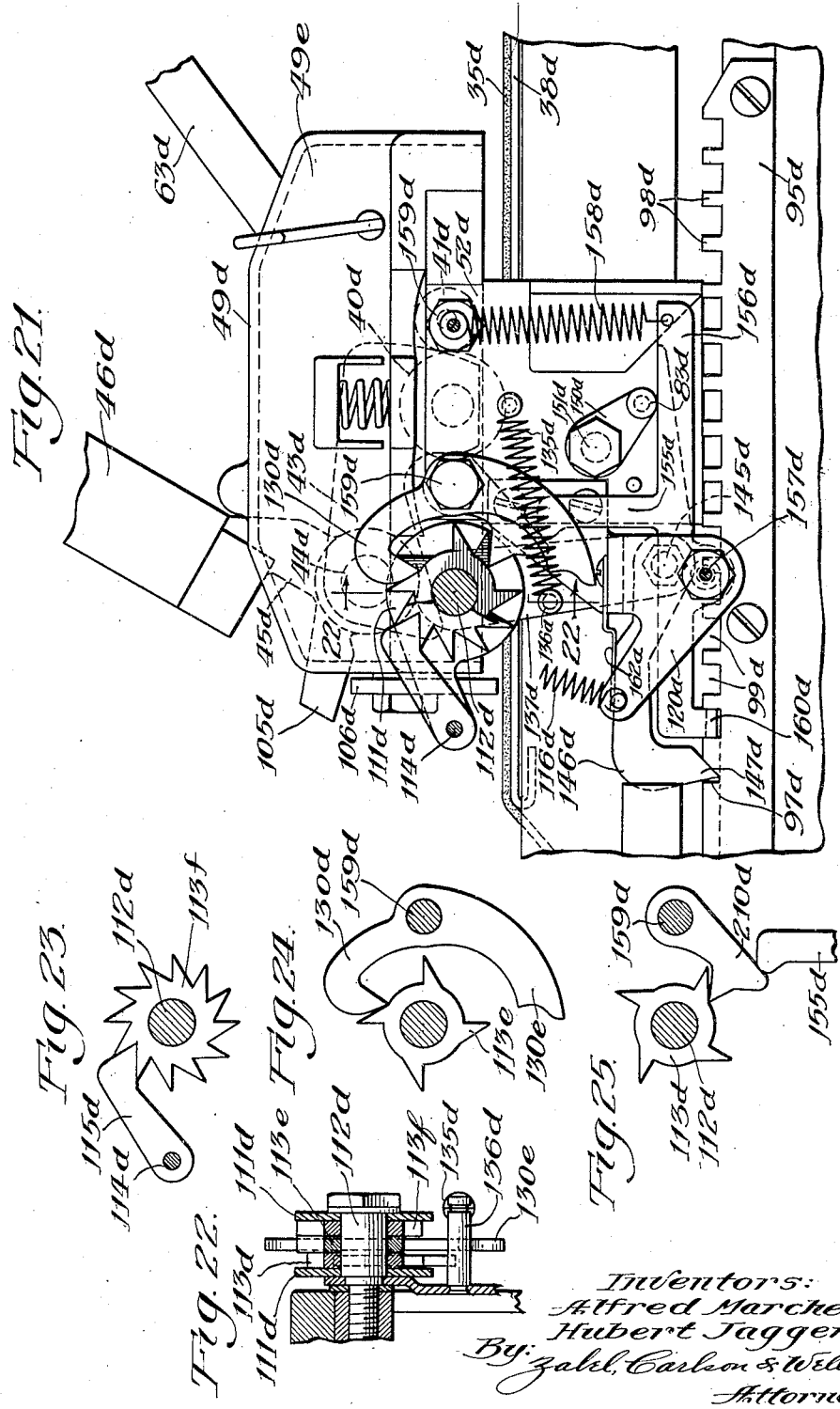

Patented Sept. 20, 1938

2,130,962

UNITED STATES PATENT OFFICE 2,130,962

DUPLICATING MACHINE

Alfred Marchev, La Grange, and Hubert Jagger, Chicago, Ill., assignors to Ditto, Incorporated, Chicago, Ill., a corporation of West Virginia Application April 1, 1937, Serial No. 134,320

20 Claims. (Cl. 101—133)

The invention relates to duplicating machines and is particularly adapted to be embodied in duplicating machines of the hectograph type but the invention is limited to this use only to the extent indicated in the appended claims.

One form of the invention is embodied in a duplicating machine of the hectograph type, the machine preferably comprising a bed plate over which a hectograph band is trained and over which a carriage is mounted for reciprocation. The carriage is provided with platen and pressure rolls which co-operate to apply copy sheets to the hectograph band when the carriage is reciprocated. The platen roller is movably mounted and is controlled by a handle which is also employed to reciprocate the carriage.

In a preferred embodiment of the invention, means is provided for holding the carriage in a single position each time the platen roller is lowered to apply a copy sheet to the hectograph band. Means is also provided for advancing the carriage in a step by step manner each time the platen roller is lowered and raised. With this construction, a copy may be made on a copy sheet of one or two lines of printing from the surface of the hectograph band and then the next line or two may be copied on the succeeding copy sheet. A duplicating machine embodying the invention is advantageous when data is to be copied from a payroll sheet or the like. Thus the data relating to a single employee, such as the hours he has worked and the amount of pay that is due him, may be copied onto a pay envelope.

Other forms of the invention are embodied in duplicating machines which permit two or more copies to be made of each line of printing, or the like, of the data on the hectograph band before the carriage and platen roller are advanced in a step by step manner.

Other objects and advantages will become apparent as the following detailed description progresses, reference being had to the accompanying drawings wherein—

Fig. 1 is a plan of a duplicating machine which embodies the invention.

Fig. 2 is a side elevation of the improved duplicating machine.

Fig. 3 is an enlarged fragmentary side elevation of the improved machine.

Fig. 3A is a side elevation of a locking lever which forms part of the mechanism shown in Fig. 3.

Fig. 3B is a side elevation of another lever which forms part of the mechanism shown in Fig. 3.

Fig. 3C is a side elevation of still another lever which forms part of the mechanism shown in Fig. 3.

Fig. 4 is a side elevation of the mechanism shown in Fig. 3, certain parts being shown in changed positions.

Fig. 5 is a section taken on line 5—5 of Fig. 3.

Fig. 6 is a section taken on line 6—6 of Fig. 3.

Fig. 7 is fragmentary view of the mechanism shown in Fig. 3, the view being taken looking from the left of Fig. 3.

Fig. 8 is a section taken on line 8—8 of Fig. 7.

Fig. 9 is a fragmentary side elevation of the mechanism shown in Fig. 3, certain parts being shown in changed positions.

Fig. 10 is a section taken on line 10—10 of Fig. 9.

Fig. 11 is a side elevation of a ratchet wheel and pawls which form part of the improved duplicating machine.

Fig. 12 is an enlarged section taken on line 12—12 of Fig. 1.

Fig. 13 is a fragmentary section taken on the same line as Fig. 12 but showing certain parts in changed positions.

Fig. 14 is a view of a payroll sheet which may be utilized in the improved duplicating machine.

Fig. 15 is a view of a pay envelope which may be employed in connection with the payroll sheet shown in connection with Fig. 14.

Fig. 16 is a fragmentary side elevation, partly broken away, of mechanism which embodies another form of the invention.

Fig. 17 is a view of the mechanism shown in Fig. 16, certain parts of the mechanism being shown in changed positions.

Fig. 18 is a section taken on line 18—18 of Fig. 16.

Fig. 19 is a side elevation of a ratchet wheel and pawl forming part of the mechanism shown in Fig. 16.

Fig. 20 is a side elevation of another ratchet wheel and its co-operating pawls, which ratchet wheel and co-operating pawls form a part of the mechanism shown in Fig. 16.

Fig. 21 is a fragmentary side elevation, partly broken away, of duplicating mechanism which embodies still another form of the invention.

Fig. 22 is a section taken on line 22—22 of Fig. 21.

Fig. 23 is a side elevation of a ratchet and its co-operating pawl, which ratchet and pawl form part of the mechanism shown in Fig. 21.

Fig. 24 is a side elevation of a ratchet and its co-operating pawl, which ratchet and pawl form part of the mechanism shown in Fig. 21.

Fig. 25 is a side elevation of still another ratchet and its co-operating pawl, which ratchet and pawl also form part of the mechanism shown in Fig. 21.

Referring for the present to Figs. 1 to 14, inclusive, wherein a preferred embodiment of the invention is illustrated, the reference character 25 designates generally the cabinet upon which the improved duplicating machine is mounted, the improved duplicating machine being designated generally by the reference character 26 (Fig. 2). The duplicating machine 26, with the exception of certain novel mechanism added thereto, is substantially identical with the duplicating machine shown and described in U. S. Letters Patent No. 2,007,473, granted July 9, 1935, to Alfred Marchev et al. The duplicating machine 26 comprises a frame 27 preferably provided with resilient pads 28 which rest upon the top surface of the cabinet 25. The frame 27 comprises hollow sheet metal side frames 29 to which the resilient pads 28 are fixed. (Figs. 1, 2, 5 and 6.) The side frames also comprise tubular sheet metal members 30 provided with enlarged ends 31 which are secured to the upper surfaces of the side frame members 29. Intermediate their ends, the frame members 30 are spaced from the frame members 29 to provide slots 32 for a purpose which will presently appear.

The improved duplicating machine shown in Figs. 1 to 13, inclusive, is of the hectograph type and is provided with a gelatin band 35 which has its ends secured to spindles (not shown). Means including a handle 36 is provided for winding and rewinding the gelatin band from one spindle to the other. This means is preferably identical with the similar means shown in U. S. Letters Patent No. 2,007,473 and as the details of the winding means do not form a part of the present invention, it will not be necessary to describe them in this instance. The gelatin band 35 passes over a bed plate 38 (Figs. 12 and 13). When the improved duplicating machine is to be used, the master sheet is first placed against the gelatinized surface of the band 35 until the data on the master sheet is duplicated on the gelatinized surface. Copy sheets are then applied to the impression on the gelatin and a plurality of such sheets may be applied to the gelatin to obtain copies of the master sheet.

Means is provided for applying the copy sheets to the gelatin band 35. This means preferably comprises a platen roller 40 which co-operates with a pressure roller 41 (Figs. 12 and 13). The platen roller 40 is fixed to a shaft 42 which has its ends journalled in a yoke 43 fixed to a shaft 44 which may be oscillated by a lever 45 provided with a handle 46. The ends of the shaft 44 are journalled in the end walls 48 of a carriage member 49 which extends over the bed plate 38 transversely thereof. The carriage member 49 is detachably secured to a second carriage member 52 by means comprising latch devices 53. The carriage member 52 is preferably in the form of a bent bar and extends through the slots 32 and underneath the bed plate 38 (Figs. 2, 3, 5 and 6). As best illustrated in Figs. 5 and 6, bars 55 project upwardly from the carriage member 52 into the tubular frame members 30, the bars 55 being secured to the frame member 52 and being provided with raceways 56 for ball bearings 57 which are mounted in fabricated U-shaped bars 58 disposed within and fixed to the tubular frame members 30. The ball bearings 57 are journalled in depressions 60 formed in the bars 58 and are retained in these depressions by ball bearing retainers 61 formed of sheet metal.

The carriage members 49 and 52, the latch devices 53 for securing the carriage member 49 to the carriage member 52 and the ball bearing construction illustrated in Figs. 5 and 6 are substantially identical with the same parts illustrated in said U. S. Letters Patent No. 2,007,473 and have substantially the same functions. The ball bearings 57 slidably journal the carriage member 52 so that it may be reciprocated longitudinally of the bed plate 38. The latch members may be manipulated so that the carriage member 49 may be detached quickly from the carriage member 52 and removed bodily therefrom. The carriage member 49 may be returned and fixed to the carriage member 52 with equal ease after it has been removed therefrom. One advantage of this construction is that it enables the operator to insert a new gelatin band 35 in the machine with little effort.

Referring now to Figs. 12 and 13 which illustrate the manner in which copy sheets are applied to the gelatin band 35, the reference character 63 designates a sheet metal guide fixed to the carriage member 49, which guide member 63 is adapted to guide copy sheets 64 between the platen roller 40 and the pressure roller 41 when they are in the positions wherein they are illustrated in Fig. 12 so that the lower end of each copy sheet may come to rest in a margin bar 65 to obtain proper registry with the impression on the gelatin band 35 when the copy sheet is subsequently applied thereto. When the handle 46 is displaced from the position wherein it is shown in Fig. 12 to the position wherein it is shown in Fig. 13, the platen roller 40 applies the lower end of the copy sheet 64 to the gelatin band 35. The pressure roller 41 co-operates with the platen roller 40 in this initial operation as is more fully explained in said U. S. Letters Patent No. 2,007,473. It may be mentioned that if the carriage comprising the members 49 and 52 is then free to be displaced to the right (Fig. 13) the platen roller 40 and the pressure roller 41 will co-operate to apply the copy sheet 64 over the full impression made upon the gelatin band 35, it being the common practice, however, to leave the last end of a copy sheet between the rollers 40 and 41 so that when the carriage comprising the members 49 and 52 is returned to the position wherein it is shown in Fig. 13, the rollers 40 and 41 will pull the copy sheet from the somewhat tacky surface of the gelatin band. It may be mentioned that the platen roller 40 is preferably made from sponge rubber.

The margin bar 65 has its ends secured to plates 67 pivoted by pins 68 to the end walls 48 of the carriage member 49. Each of the plates 67 is provided with a notch 69 engageable by a pin 70 projecting from one of the arms of the yoke 43. Pins 72 projecting inwardly from the end walls 48 of the carriage member 49 are engageable by the upper ends of the plates 67. A spring 73 tends to rotate the plates 67 in a counter-clockwise direction (Figs. 12 and 13). One end of the spring 73 is attached to the upper end of one of the plates 67, the other end of the spring being attached to a ring 75 mounted on the shaft 44. When the handle 46 is in the position wherein it is shown in Fig 12 so that the platen roller 40 and the pressure roller 41 are spaced from each other to permit a copy sheet 64 to be fed between them, the margin bar 65 is in the position wherein it is shown in Fig. 12, the margin bar 65 being held in this position by the spring 73. It will be noted that one of the plates 67 then rests against the stop pin 72. However, when the handle 46 is displaced from the position wherein it is shown in Fig. 12 to the position wherein it is shown in Fig. 13, the pins 70 on the yoke 43 engage the notches 69 of the plates 67 and displace the plates 67 and the margin bar 65 in a clockwise direction (Figs. 12 and 13) against the action of the spring 73 so that the margin bar assumes the position wherein it is shown in Fig. 13.

Referring now to Figs. 1, 2, 9 and 10 it will be noted that a stop member 80 is pivoted by a pin 81 to a bracket 82 which is fixed to one of the side frames 29. The stop member 80 is engageable with a pin 83 for a purpose which will presently appear. At the back end of the frame, a rubber bumper 84 is provided. The bumper 84 is secured to the forward end of a bracket 85. Projecting through and journalled in the back end of the bracket 85 is a pin 87 which also projects through a plate 86 formed with shoulders 88 and 89. The shoulder 88 rests against the adjacent frame member 30 and the shoulder 89 rests against the adjacent frame member 29, a portion of the plate 86 being disposed in the slot 32 between these two frame members. The inner end of the pin 87 is screw threaded into a block 90 which also abuts against the adjacent frame members 30 and 29. At its outer end, the pin 87 is provided with a knob 91 which is fixed to it and may be manipulated to draw the plate 86 and the block 90 toward each other so that they will frictionally engage the adjacent frame members 29 and 30 with sufficient force to hold the bracket member 85 in any one of a plurality of adjusted positions. Of course, the knob 91 may be manipulated to release the bracket 85 when it is desired to move it to a new position. Fixed to the forward end of the bracket 85 is a stop bar 93 which is also engageable with the pin 83 for a purpose hereinafter set forth.

As best shown in Figs. 2, 3, 4 and 7, a toothed bar 95 is secured to one of the side frames 29 by screws 96. At its forward end, the bar 95 is provided with a V-shaped notch 97 and along the remainder of the bar in back of the V-shaped notch 97, a plurality of substantially rectangular teeth 98 are provided, which teeth 98 provide notches 99 between them. At its forward end the bar 95 is provided with a bevelled surface 100 for a purpose which will also presently appear.

As stated above, it is common practice in a duplicating machine of the character described to reciprocate the carriage over the bed plate to apply copy sheets to the gelatin band, a copy sheet being printed with each reciprocation of the carriage. In the improved machine illustrated in Figs. 1 to 13, inclusive, the carriage 49—52 may be operated in this manner as hereinafter described but it may also be operated in a step by step manner during its printing stroke so that a plurality of copy sheets, or the equivalent, may be employed during each printing stroke of the carriage. With such construction, one or more lines of printing, or the equivalent, may be copied on a copy sheet for each step of the printing stroke. Thus, for example, with the carriage 49—52 in the position wherein it is shown in Figs. 2 and 3 but the handle 46 in the position wherein it is shown in Fig. 12, a copy sheet may be inserted in the manner described above and the handle 46 may be displaced from the position wherein it is shown in Fig. 12 to the position wherein it is shown in Fig. 13 so that the forward portion of the copy sheet will be pressed against the gelatin band 35 to obtain a copy of one or more lines of printing on the band. Then the handle 46 may be returned to the position wherein it is shown in Fig. 12 and the copy sheet may be removed from the carriage but meanwhile the carriage 49—52 has moved to the right (Fig. 3) a distance equal to the spacing of the teeth 98. When the next copy sheet is inserted in the carriage 49—52, the lower or forward end of such copy sheet will copy lines of printing spaced from the lines of printing which were copied by the first copy sheet a distance equal to the spacing between the teeth 98. The construction of the mechanism for obtaining this cycle of operations is as follows:

Referring to Fig. 7 it will be noted that the lever 45, to which the handle 46 is attached, is provided with a lug 105 which is engageable with one end of a lever 106 which is pivoted intermediate its ends on the carriage member 49 by a bolt 107. That end of the lever 106 disposed in the path of the lug 105 is hinged to the main portion of the lever as shown at 108 (Figs. 7 and 8). The hinged end of the lever is designated by the reference character 110. As indicated in dotted lines in Fig. 8, the hinged end 110 of the lever 106 may be swung out of the path of the lug 105. The other end of the lever 106 is engageable with two levers 111 which are identical in construction and are pivoted upon a pin 112 (Fig. 5). The levers 111 are spaced from each other by a ratchet 113 and are secured to each other by a pin 114 through the free ends thereof, the pin 114 being adapted to journal a pawl 115 which co-operates with the ratchet 113. As illustrated in Figs. 3 and 4, when the lever 106 is displaced in a counter-clockwise direction (Fig. 7) by the lug 105, the right hand end (Fig. 7) of the lever 106 will engage the levers 111 and displace them in a clockwise direction (Figs. 3 and 4) against the action of a spring 116. The levers 111 will be displaced from the position wherein they are shown in Fig. 3 to the position wherein they are shown in Fig. 4. One end of the spring 116 is fixed to a pin 117 projecting from one of the levers 111, the other ends of the spring 116 being fixed to a pin 118 which projects from a bracket 120 secured to the carriage member 52 by screws 121 (Fig. 3).

The pin 112 has one end screw-threaded into a block 125 which is secured to the carriage member 52 (Figs. 3 and 5). The block 125 fits snugly in the recess 126 formed in the carriage member 49. It may be mentioned that there is a block 125 at each end of the carriage member 52 and that each of the blocks 125 fit snugly in a similarly shaped recess 126 formed in the carriage member 49. In other words, when the carriage member 49 is attached to the carriage member 52 through manipulation of the latch devices 53, the recesses 126 receive the blocks 125 and correctly position the carriage member 49 upon the carriage member 52.

When the levers 111 are displaced from the position wherein they are shown in Fig. 3 to the position wherein they are shown in Fig. 4, the pawl 115 displaces the ratchet 113 in a clockwise direction (Figs. 3 and 4) which, during such angular displacement, displaces a pawl 130 from the position wherein shown in Fig. 3 to the position wherein it rests in the next notch between the teeth of the ratchet wheel 113 but it passes over one of the teeth of the ratchet wheel as shown in Fig. 4. The pawl 130 is pivoted by a pin 131 to one end of the carriage member 52. Mounted on the pin 131 between the pawl 130 and a head provided on the outer end of the pin is a plate 133 from which a pin 134 projects. One end of a spring 135 is fixed to the pin 134, the other end of the spring 135 being fixed to a pin 136 which projects from a lever 137. The lever 137 is shown by itself in Fig. 3B and is pivoted upon the pin 112. It will be noted that the lever 137 is pivoted intermediate its ends and at its upper end is provided with two laterally extending lugs 139 and 140 which are engageable by the levers 111. When the mechanism is in the condition wherein it is illustrated in Fig. 3, the free ends of the levers 111 engage the lug 140 but when the levers 111 are displaced in a counter-clockwise direction (Figs. 3 and 4) by the lever 106, the levers 111 leave the lug 140 and then engage the lug 139 to displace the lever 137 to the position wherein it is illustrated in Fig. 4. It will be noted that there is lost motion as far as the lever 137 is concerned as the levers 111 travel an appreciable distance after they leave the lug 140, before they engage the lug 139 during their displacement of the lever 137.

Pivoted to the lower end of the lever 137 by a pin 145 is a lever 146 which, at one end, has a V-shaped nose 147. In Fig. 3, the V-shaped nose 147 is disposed in the V-shaped slot 97. The other end of the lever 146 is designated by the reference character 148 and is engageable by the pin 83. The pin 83 projects from the free end of a lever 150 which is pivoted upon a pin 151 projecting from the carriage member 52 (Figs. 3, 4 and 6).

When the pawl 130 is displaced into the position wherein it is shown in Fig. 4, it pushes downwardly upon a lug 155 projecting from a lever 156 which is pivoted intermediate its ends by a pin 157 projecting from the bracket 120. A spring 158 has one of its ends secured to the lever 156, the other end of the spring 158 being fixed to one of a pair of bolts 159 which secure one of the blocks 125 to the carriage member 52. The other end of the lever 156 is provided with a laterally extending lug 160 which is engageable with the notches 99 provided in the bar 95 (Figs. 3 and 4). A leaf spring 162 fixed to the bracket 120 has its free end engaging the left hand end (Fig. 3), of the lever 146, the spring 162 yieldingly urging the lever 146 in a counterclockwise direction (Figs. 3 and 4).

When the lever 150 carrying the pin 83 is displaced from the position wherein it is shown in Figs. 3 and 4 to the position wherein it is shown in Fig. 9, the levers 146 and 156 are engaged by and are displaced angularly in a clockwise direction (Figs. 3, 4 and 9) against the action of the springs 158 and 162. When the levers 146 and 156 are in the positions wherein they are shown in Fig. 9, the lug 160 of the lever 156 is held in a position wherein it cannot engage the teeth 98 or the slots 99 and the V-shaped nose 147 of the lever 146 cannot engage the V-shaped notch 97 or the notches 99. The lever 150 may be displaced manually from the position wherein it is shown in Figs. 3 and 4 to the position wherein it is shown in Fig. 9 and it may be returned manually. Also, when the carriage 49—52 is moved to the right (Fig. 2) a sufficient distance, the stop bar 93 will engage the pin 83 and displace the lever 150 from the position wherein it is shown in Figs. 3 and 4 to the position wherein it is shown in Fig. 9. It will be noted that angular displacement of the lever 150 in a clockwise direction (Fig. 9) is limited by a stop pin 165 projecting from the carriage member 52. When the carriage 49—52 is moved forwardly on the improved machine a sufficient distance, the pin 83 will strike the bent bar 80 and will displace the lever 150 in a counterclockwise direction (Figs. 2 and 9) so that the levers 146 and 156 will be displaced angularly in a counterclockwise direction (Figs. 3 and 4) by the springs 162 and 158, respectively. In other words, the levers 146 and 156 are then released to function automatically in a manner hereinafter described.

The operation of the above described mechanism will be explained in connection with Figs. 14 and 15. In Fig. 14 the reference character 170 designates generally a master sheet which is a sheet of paper upon which payroll data has been printed with hectograph ink. The payroll has suitable data printed thereon to identify the period of time covered by it, etc. In addition, it is provided with a plurality of vertically extending columns which are divided by horizontally extending lines 171 into horizontally extending columns. In each horizontally extending column, suitable data with respect to each individual employee and the amount he is to receive as wages or salary for the period of the payroll is printed in hectograph ink. It will be noted that a relatively large number of employees may be identified on the master sheet 170 and that the data with respect to their wages or salaries, etc., may also be printed on the master sheet.

The master sheet 170 may be applied directly to the gelatin band 35 without using the platen roller 40 and the pressure roller 41 but is preferably applied to the gelatin band by placing it in the guide 63 and permitting its forward end to come to rest against the margin bar 65. The lever 150 is then in the position wherein it is shown in Fig. 12. The handle 46 is then brought into the position wherein it is shown in Fig. 13 so that the forward end of the master sheet is applied to the gelatin band and then the carriage 49—52 is displaced to the right (Fig. 13) until all of the data thereon relating to the employees has been brought into contact with the gelatin band. After the master sheet has remained in contact with the gelatin band for some time it is stripped therefrom and the envelopes 64 can be applied thereto to duplicate data thereon. It may be mentioned that in the embodiment of the invention illustrated in Figs. 1 to 13, inclusive, the master sheet 170 is inserted between the rollers 40 and 41 with its upper end downwards so that it engages the margin bar 65. Of course, the master sheet is placed in the carriage 49—52 with its printed face downward so that this face will contact the gelatin band. When the master sheet is to be applied to the hectograph band 35, the bent bar 80 may be swung into the dotted position wherein it is shown in Fig. 2 and the carriage 49—52 may be moved as far as possible toward the left hand end (Fig. 2) of the frame. The bar 95 is fixed to the frame in such a position that proper registry will be obtained when the carriage 49—52 is returned to the position wherein it is shown in Fig. 2 and the first envelope 64 is fed into the carriage.

One purpose of the improved mechanism is to provide means to take a separate impression or copy of the data relating to each employee. These separate impressions may be taken upon slips of paper or pay envelopes, etc. If it is assumed that the copy sheets 64 discussed above are pay envelopes, it will be readily understood that the carriage 49—52 may be brought into the position wherein it is illustrated in Fig. 3 but with the handle 46 in its upright position wherein it is shown in Fig. 4 so that the platen roller 40 and the pressure roller 41 will occupy the relative positions wherein they are shown in Fig. 12. The nose 147 will not then rest in the notch 97 as shown in Fig. 3, but will rest upon the bar 95 to the left (Fig. 3) of the notch 97 although the lug 160 will engage the first notch 99 as shown in Fig. 3. A pay envelope 64 may be inserted between the platen roller 40 and the pressure roller 41 in the manner illustrated in Fig. 12. The handle 46 is then displaced in a clockwise direction (Figs. 12 and 13) so that the platen roller 40 and the pressure roller 41 co-operate to press a portion of the pay envelope against the gelatin band. The registry of the pay envelope with respect to the data relating to the first employee listed on the master sheet will be such that it will be printed upon the pay envelope. This data may include a number identifying the employee, the employee's name, the amount of his salary, etc., as indicated in Fig. 15 wherein a pay envelope 64 is shown.

Fig. 3 illustrates the position of the carriage 49—52 when the first duplicating operation is taking place. However, when the handle 46 is displaced in a counter-clockwise direction (Fig. 3) to bring it into the position wherein it is shown in Fig. 4 so that the platen roller 40 and the pressure roller 41 are in the positions wherein they are shown in Fig. 12, the carriage 49—52 is advanced a distance equal to the spacing or pitch of the teeth 98. Thus, in Fig. 4, it will be noted that the carriage 49—52 has advanced a distance which brings the lug 160 into registry with the second slot 99 from the left instead of the first slot as shown in Fig. 3. This movement is accomplished as follows: When the handle 46 is first displaced into the position wherein it is shown in Fig. 3 for the first duplicating operation the lever 146 is displaced to the right (Fig. 3) until the nose 147 drops in the notch 97 by the action of the spring 162. This bodily displacement of the lever 146 to the right (Fig. 3) is accomplished by the spring 135 when the handle 46 is displaced into the position wherein it is shown in Fig. 3 as the right hand end (Fig. 7) of the lever 106 moves downwardly under the action of the spring 116 and permits the lever 137 to be displaced angularly in a counter-clockwise direction (Fig. 3) by the spring 135 so that the lever 146 brings its nose 147 to the slot 97. Now after the initial printing operation has taken place and the handle 46 is moved from the position wherein it is shown in Fig. 3 to the position wherein it is shown in Fig. 4, the lug 105 on the lever 45 engages the hinged end 110 of the lever 106 and displaces the lever 106 in a counter-clockwise direction (Fig. 7) so that the other end of the lever displaces the levers 111 in a clockwise direction (Figs. 3 and 4) and the pawl 115 rotates the ratchet 113 to the position wherein it is shown in Fig. 4 so that the free end of the pawl 130 passes over the top of one of the teeth of the ratchet 113 as illustrated in Fig. 4. Meanwhile, the levers 111 have engaged the lug 139 of the lever 137 and have displaced the lever 137 angularly to the position wherein it is shown in Fig. 4. The lever 146 which is pivoted to the bottom end of the lever 137 remains in engagement with the V-shaped notch 97 and therefore the pin 145 which pivots the lever 146 to the lever 137 serves as a fulcrum point and the carriage 49—52 and the mechanism carried by it are displaced from the position wherein they are shown in Fig. 3 to the position wherein they are shown in Fig. 4 so that the lug 160 of the lever 156 comes into registry with the second slot 99 from the left of the bar 95. However, it will be readily understood that to accomplish this movement of the carriage 49—52, it is first necessary to withdraw the lug 160 from the first slot 99 from the left of the bar 95. This is done by the pawl 130 which immediately upon movement of the ratchet wheel 113, as described above, moves in a counter-clockwise direction (Figs. 3 and 4) and displaces the lug 155 and the lever 156 in a clockwise direction (Fig. 4) to withdraw the lug 160 from the slot 99 engaged by the lug 160 in Fig. 3. The lost motion between the time the levers 111 leave the lug 140 and engage the lug 139 of the lever 137 permits the disengagement of the lug 160 from the first slot 99 from the left of the bar 95 before the carriage 49—52 begins to move to the right (Fig. 3). When the carriage 49—52 is moved to the right (Figs. 3 and 4) from the position wherein it is shown in Fig. 3 to the position wherein it is shown in Fig. 4, the lever 156 moves bodily with the carriage as it is pivoted on the pin 157 which is fixed with respect to the carriage. Of course, as soon as the pawl 130 has passed over the tooth with which it is shown in engagement in Fig. 4, it drops into the succeeding notch of the ratchet wheel 113 and the lever 156 is displaced by the spring 158 so that the lug 160 drops into the second slot or notch 99 from the left hand end (Fig. 4) of the bar 95.

The next pay envelope 64 may then be inserted after which the handle 46 may be displaced from the position wherein it is shown in Fig. 4 to the position wherein it is shown in Fig. 3, to copy the next line of data from the hectograph band 35. Such movement of the handle 46 lifts the lug 105 so that the lever 106 does not prevent counter-clockwise movement (Fig. 4) of the levers 111. The spring 135 then displaces the lever 137 in a counter-clockwise direction (Fig. 4) and it pulls the lever 146 along with it so that the V-shaped nose 147 of the lever 146 falls into the first slot 99 from the left (Fig. 4) of the bar 95. Meanwhile, the spring 116 has retracted the levers 111 to the position wherein they are shown in Fig. 3 with respect to the lever 137. It will be noted that the V-shaped nose 147 does not prevent the lever 146 from being pulled along to the right (Fig. 4) although it will prevent the carriage 49—52 from being urged bodily to the left (Fig. 4) as long as the nose is engaged with the V-shaped notch 97 or one of the slots 99. Of course, when the lug 160 of the lever 156 is engaged with one of the slots 99, the carriage 49—52 is held against displacement in either direction.

Now if it is assumed that the second envelope 64 has had the proper data copied upon it and that it is in the position wherein it is shown in Fig. 13, the next step is to displace the lever 46 in a counter-clockwise direction (Figs. 4 and 13) whereupon the cycle of operations described above when it was assumed that the lever 46 was moved from the position wherein it is shown in Fig. 3 to the position wherein it is shown in Fig. 4 is repeated and the carriage moves to the right (Fig. 4) a distance equal to the spacing or pitch of the teeth 98. Of course, the platen roller 40 then moves away from the pressure roller 41 and the pay envelope 64 may be withdrawn to be replaced by another pay envelope upon which will be copied data with respect to the next employee on the payroll list. The operations described above in connection with the printing of the first pay envelope are then duplicated for the printing of the third pay envelope and are repeated as often as necessary until all of the data on the payroll sheet have been copied, it being understood that after each cycle of operations with respect to a single pay envelope 64, the carriage 49—52 moves bodily to the right (Fig. 4) a distance equal to the spacing or pitch of the teeth 98.

It will be readily understood that the carriage 49—52 may be returned at any time to the position shown in Fig. 3 if the lever 150 is displaced manually in a clockwise direction (Fig. 4) to bring the pin 83 into a position wherein it will hold the levers 156 and 146 in the positions wherein they are shown in Fig. 9. After the carriage 49—52 has been brought into the position wherein it is shown in Fig. 3, the lever 150 may be returned to the position wherein it is shown in Fig. 3 so that the lever 156 will occupy the position wherein it is shown in Fig. 3. As described above, the nose 147 of the lever 146 will then rest on the bar 95 to the left (Fig. 3) of the V-shaped notch 97. However, when the carriage 49—52 has reached and passed the last effective slot 99 in the bar 95 toward the right in said Fig. 3, the carriage may be displaced to the right (Fig. 2) so that the stop bar 93 will displace the lever 150 and the pin 83 toward the left in said figure as described above to lift the levers 146 and 156. The carriage may then be moved rapidly to the forward end of the machine to a point some little distance to the left of the position as shown in Fig. 3 so that the bar 80 will displace the lever 150 and the pin 83 again toward the right in said Figs. 2 and 3 to allow the holding ends of the levers 146 and 156 to drop. Then when the carriage is returned to the position wherein it is shown in Fig. 3, the lug 160 will engage the first slot 99 and the nose 147 will rest on the bar 95 to the left (Fig. 3) of the notch 97, whereupon the mechanism may be manipulated as described above.

As best shown in Fig. 5, the mechanism comprising the levers 137, 146 and 156 and the mechanism associated with them is preferably concealed behind a plate 200 which has a slot (not shown) in which the pin 83 may oscillate. The plate 200 is fixed to the pins 157 and 159. The plate 200 is not shown in Figs. 2, 3 and 4.

It may be mentioned that the reason for making the notch 97 V-shaped is to prevent the lug 160 from dropping into it. This facilitates the task of bringing the carriage 49—52 into the position wherein it is shown in Fig. 3.

From the above description of the mechanism shown in Figs. 1 to 13, inclusive, it will be understood that a single impression is taken of the data relating to any particular employee with each oscillation of the handle 46 and that the carriage then shifts to bring it into registry with the data for the next employee on the list. Of course, the entire set of operations may be repeated to obtain additional copy sheets or pay envelopes having the same data thereon.

In the apparatus shown in Figs. 16 to 20, inclusive, and the apparatus shown in Figs. 21 to 25, inclusive, a plurality of copies may be made of the data relating to a single employee before the carriage moves to the next position.

Referring now to Figs. 16 to 20, inclusive, wherein duplicating apparatus embodying another form of the invention is shown, the reference character 49b designates a carriage, which, with the exception of some minor modifications, is identical with the carriage 49—52 described above. Journalled in the carriage 49b is a shaft 44b to which a yoke 43b is fixed, the yoke 43b being provided with a platen roller 40b and being formed integral with a lever 45b provided with a handle 46b. A pressure roller 41b journalled in the carriage 49b cooperates with the platen roller 40b in the same manner as the pressure roller 41 described above co-operates with the pressure roller 40. The lever 45b is provided with a lug 105b. The yoke 43b, the handle 46b and the lug 105b have the same functions as the corresponding parts described in connection with Figs. 1 to 13, inclusive.

The lug 105b will displace a lever 106b when the handle 46b is displaced from the position wherein it is shown in Fig. 16 to the position wherein it is shown in Fig. 17. The lever 106b is preferably identical in construction with the lever 106 described above and has the same function, the lever 106b being pivoted to the carriage 49b. The carriage 49b comprises a carriage member 52b corresponding to the carriage member 52 described above and the carriage member 52b is provided with blocks 125b corresponding to the blocks 125 described above. The carriage member 49b also comprises a carriage member 49a which corresponds to the carriage member 49 above. The carriage member 49a is secured detachably to the carriage member 52b by latch devices 53b preferably identical with the latch devices 53 described above.

Projecting from the carriage member 52b is a pin 112b and journalled on the pin 112b are ratchets 113b and 113c, the ratchets 113b and 113c being constrained to rotate with each other. Levers 111b pivoted upon the pin 112b, with the ratchets 113b and 113a between them, have their free ends secured to each other by a pin 114b. The levers 111b correspond to the levers 111 described above. Pivoted upon the pin 114b is a pawl 115b which corresponds to the pawl 115 described above, the pawl 115 being engageable with the teeth of the ratchet 113c. The teeth of the ratchets 113b and 113c are best shown in Figs. 20 and 19, respectively, and it will be noted that the ratchet 113c is provided with twice as many teeth as the ratchet 113b. A spring 116b has one of its ends fixed to a pin 117b projecting from one of the levers 111b, the other end of the spring 116b being fixed to a pin 118b projecting from a bracket 120b. The bracket 120b is substantially identical with the bracket 120 described above and is secured to the frame member 52b. It will be noted that the spring 116b tends to rotate the levers 111b in a counter-clockwise direction (Figs. 16 and 17). It will be understood that when the lever 46b is displaced from the position wherein it is shown in Fig. 16 to the position wherein it is shown in Fig. 17, the lug 105b will displace the lever 106b so that it, in turn, will rotate the levers 111b in a clockwise direction (Fig. 16). The construction is such that the angular distance through which the levers 111b are displaced, causes the pawl 115b to rotate the ratchet 113c the distance of one tooth. Of course, the ratchet 113b will be advanced through the same angular distance but the ratchet 113b will only be advanced half the distance between its teeth.

Co-operating with the ratchet 113b is a pawl 130b which is pivoted on a pin 159b, the pawl 130b being provided with a tail piece 130c which is engageable with a pin 136b projecting from a lever 137b pivoted upon the pin 112b. The functions of the lever 137b resembles, to some extent, the functions of the lever 137 described above but it will be noted that it is not provided with lugs corresponding to the lugs 139 and 140 described above. It will also be noted that when the handle member 46b is in the position wherein it is shown in Fig. 16, the tail end 130c of the pawl 130b is spaced from the pin 136b but that when the handle 46b is in the position wherein it is shown in Fig. 17, the tail piece 130c abuts against the pin 136b. It will be noted further that the lever 137b in Fig. 17 is displaced from the position wherein it is shown in Fig. 16 with respect to the carriage 49b.

A spring 135b has one end fixed to the pin 136b and has its other end fixed to a pin 131b projecting from the carriage member 52b. The spring 135b tends to rotate the lever 137b in a counter-clockwise direction (Figs. 16 and 17).

Also co-operating with the ratchet 113b is a pawl 210 which is pivoted upon the pin 159b. A lug 155b projecting from a lever 156b is disposed beneath the pawl 210 and is engageable therewith. The lever 156b is pivoted intermediate its ends upon a pin 157b projecting from the bracket 120b. A spring 158b has one of its ends secured to the lever 156b and has the other of its ends secured to a pin 159b. The spring 158b tends to displace the lever 156b angularly in a counter-clockwise direction (Fig. 16). At its forward end, the lever 156b is provided with a lug 160b. The lever 156b and the lug 160b correspond to the lever 156 and the lug 160, respectively, described above and have substantially the same functions. It will be noted that the lug 160b is adapted to engage any one of a plurality of slots 99b provided between teeth 98b projecting from a bar 95b which is preferably identical in construction with the bar 95 described above and has the same functions. The bar 95b is provided with a V-shaped notch 97b which corresponds to the V-shaped notch 97 described above and is engageable with the V-shaped nose 147b of a lever 146b which is identical in construction with the lever 146 described above and has substantially the same functions. The lever 146b is pivoted by a pin 145b to the lower end of the lever 137b.

A leaf spring 162b fixed to the bracket 120b has its free end resting upon the lever 146b and tends to rotate that lever in a counter-clockwise direction (Fig. 16). A lever 150b is pivoted upon a pin 151b and is provided with a pin 83b at its free end. The lever 150b and the pin 83b are identical in construction with the lever 150 and the pin 83, respectively, described above and have the same functions. Thus the pin 83b may be angularly displaced in a clockwise direction (Fig. 16) until the lever 150b engages a stop pin 165b whereupon the pin 83b will hold the forward ends of the levers 146b and 156b out of engagement with the notches or slots 97b and 99b.

The bar 95b is fixed to the bed portion of a duplicating machine which is preferably identical to the corresponding bed portion of the duplicating machine illustrated in Figs. 1 to 13, inclusive, the bed portion of the machine shown in Figs. 16 and 17 being provided with a bed plate 38b and a gelatin band 35b which correspond to the bed plate 38 and the gelatin band 35 described above.

Mounted on the frame of the duplicating machine shown in Figs. 16 and 17 is a hinged bent bar 80b which is preferably identical with the bent bar 80 described above and has the same function.

The operation of the mechanism shown in Figs. 16 to 20, inclusive, is substantially as follows: Fig. 16 corresponds to Fig. 3 described above as far as the initial operation of the mechanism is concerned and Fig. 17 corresponds to Fig. 4. When the mechanism is in the condition in which it is illustrated in Fig. 16, the lug 160b engages the first slot 99b (from the left) of the bar 95b and the nose 147b is in engagement with the notch 97b. The platen roller 40b and the pressure roller 49a then have the first envelope 64 between them. A guide 63b, identical with the guide 63 described above, is provided upon the carriage 49b to guide the envelopes or copy sheets to the rollers 40b and 41b.

Now if it is assumed that the handle 46b is displaced to bring it into the position wherein it is shown in Fig. 17, the pawl 115b will rotate the ratchet 113c through the distance of one tooth of the ratchet 113c and the ratchet 113b will be displaced the same angular distance. However, as the teeth of the ratchet 113b are spaced twice the angular distance apart that the teeth of the ratchet 113c are spaced, the teeth of the ratchet 113b shown in engagement with the pawls 130b and 210 in Fig. 20 will leave the pawls but the following teeth will not come into engagement therewith and therefore the pawls will remain in the positions wherein they are shown in Fig. 20. The direction in which the ratchets 113c and 113b are advanced during the operation of the improved mechanism is indicated by arrows in Figs. 19 and 20. When the handle 46b is in the position wherein it is shown in Fig. 17, the rollers 40b and 41b are spaced from each other and the second pay envelope, or the equivalent, may be introduced between them against a margin bar (not shown) preferably identical with the margin bar described in connection with the duplicating machine illustrated in Figs. 1 to 13, inclusive. Then when the handle 46b is displaced to the position wherein it is shown in Fig. 16 from the position wherein it is shown in Fig. 17, the platen roller 40b cooperates with the pressure roller 41b to apply the second pay envelope, or the equivalent, to the same data on the gelatin band 35b as was copied on the first pay envelope or the equivalent. Now when the handle 46b is returned to the position wherein it is shown in Fig. 17 so that the second pay envelope, or the equivalent, may be withdrawn from the carriage 49b, the ratchet 113c will be advanced in the direction indicated by the arrow in Fig. 19 through the distance of one tooth by the action of the lever 106b and the pawl 115b. The ratchet 113b will be displaced the same angular distance and it will be noted that the teeth following the teeth engaged by the pawls 130b and 210 in Fig. 20 will then engage the pawls and displace them, the pawl 130b being displaced in a clockwise direction (Fig. 20) and the pawl 210 being displaced in a counterclockwise direction (Fig. 20). The pawl 210 is in engagement with the lug 155b and the displacement of the pawl 210 is accompanied by displacement of the lug 155b and the lever 156b so that the lever 156b assumes the position wherein it is shown in Fig. 17 so that the carriage 49b may be displaced to the right (Figs. 16 and 17). However, it will be noted that the nose 147b remains in engagement with the notch 97b and prevents displacement of the carriage to the left. The displacement of the pawl 130b causes its tail piece 130c to engage the pin 136b and to displace the lever 137b in a clockwise direction (Figs. 16 and 17) with respect to the pin 112b. As the lever 146b is pivoted to the lever 137b and the lever 146b cannot be displaced to the left (Figs. 16 and 17) as its nose 147b is in engagement with the notch 97b, the result is that the carriage 49b is displaced to the right (Figs. 16 and 17) a distance equal to the spacing of the teeth 98b to bring the carriage 49b approximately into the position wherein it is shown in Fig. 17. The term "approximately" is employed as there is a further slight movement of the ratchet wheels 113c and 113b caused by continued displacement of the handle 46b in a counter-clockwise direction (Fig. 17), which movement causes the pawls 130b and 210 to fall into the positions wherein they are shown in Fig. 20 so that the cycle of operation may be begun again.

It will be apparent that the mechanism shown in Figs. 16 to 20, inclusive, operates in much the same manner as the similar mechanism shown in Figs. 1 to 13, inclusive, but that the mechanism in Figs. 16 to 20, inclusive, permits two impressions to be taken of each line of data on the hectograph band before the carriage is advanced one step to make the next line of data available.

Referring now to the mechanism illustrated in Figs. 21 to 25, inclusive, wherein another embodiment of the invention is illustrated, the reference character 49d designates generally a carriage which, with the exception of some small modifications, is identical with the carriage 49—52 described above. The carriage 49d is mounted to reciprocate over the bed plate 38d of a duplicating machine which has a frame preferably identical with the frame of the duplicating machine shown in Figs. 1 to 13, inclusive. A gelatin band 35d is trained over the bed plate 38d. The carriage 49d comprises carriage members 49e and 52d which correspond to the carriage members 49 and 52 described above. Projecting from the carriage member 52d is a pin 112d which corresponds to the pin 112 described above. Rotatably journalled on the pin 112d and constrained to rotate with each other, are ratchet wheels 113d, 113e and 113f. A pawl 115d co-operates with the ratchet wheel 113f, a pawl 130d co-operates with the ratchet wheel 113e and a pawl 210d co-operates with the ratchet wheel 113d. The pawl 130d is provided with a tail piece 130e which corresponds to the tail piece 130c of the pawl 130b described above. The pawl 130d is pivoted on one of a plurality of bolts 159d covered by the carriage 49d. The same bolt also pivots the pawl 210d. The pawl 115d is pivoted on a pin 114d which extends between and is fixed to the free ends of a part of levers 111d, only one of which is shown in Fig. 21 as the other has been omitted to illustrate the relative positions of the ratchet wheels 113d, 113e and 113f. Both levers 111d are shown in Fig. 22 and it will be noted that they are pivoted upon the pin 112d and that the ratchet wheels 113d, 113e and 113f are disposed between them.

The carriage 49d has a lever 106d pivoted to it, the lever 106d being identical in construction and having the same function as the lever 106 described above. One end of the lever 106d is engageable by a lug 105d projecting from a lever 45d provided with a handle 46d. The handle 46d, the lever 45d and the lug 106d are identical with the handle 46, the lever 45 and the lug 106, respectively, described above and have the same functions. The lever 45d is pivoted upon a shaft 44d which is mounted in the carriage 49d and has the same function as the shaft 44 described above. Formed integral with the lever 45d is a yoke 43d carrying a platen roller 40d which co-operates with a pressure roller 41d. The yoke 43d, the platen roller 40d and the pressure roller 41d are identical with and have the same functions as the yoke 43, the platen 40 and the pressure roller 41, respectively, described above. The carriage 49d has a guide 63d corresponding to the guide 63 described above.

The tail piece 130e of the pawl 130d is engageable with a pin 136d projecting from a lever 137d which has substantially the same function as the lever 137 described above. Pivoted to the free end of the lever 137d by a pin 145d is a lever 146d provided with a V-shaped nose 147d. The lever 146d corresponds to the lever 146 described above and has substantially the same function.

The pawl 210d is engageable with a lug 155d projecting from a lever 156d which is pivoted upon a pin 157d projecting from a bracket 120d which is fixed to the carriage member 52d. A spring 158d tends to rotate the lever 156d in a counter-clockwise direction (Fig. 21). The lever 156d is provided with a lug 160d engageable with slots or notches 99d formed in a bar 95d which is identical with the bar 95 described above and has the same function. It will be noted that the slots 99d form teeth 98d between them. The V-shaped nose 147d of the lever 146d is engageable with a V-shaped slot 97d formed in the bar 95d. Of course, the bar 95d is fixed to the frame of the duplicating machine.

A spring 135d tends to rotate the lever 137d in a counter-clockwise direction (Fig. 21). A spring 116d has one end fixed to the bracket 120d and has its other end (not shown) fixed to one of the levers 111d in the same manner as the spring 116 described above has one of its ends fixed to one of the levers 111. The carriage 49d is provided with a lever 150d from which a pin 83d projects. The lever 150d is pivoted upon a pin 151d. The lever 150d and the pin 83d may be swung into a position wherein the pin 83d holds the levers 146d and 156d in positions wherein the nose 147d and the lug 160d cannot engage the notches 97d and 99d. The purpose of this construction is substantially identical with the purpose of the similar construction described in connection with Figs. 1 to 13, inclusive.

The mechanism shown in Figs. 21 to 25, inclusive, is constructed so that instead of taking one impression or two impressions of each line of data on the hectograph band, three impressions are taken of each line of data. In other words, if it is assumed that the data is copied on envelopes 64, three envelopes may be inserted to have the data duplicated thereon before the carriage 49d advances to the next position. As the mechanism is illustrated in Fig. 21, the third impression is being taken on an envelope 64 of a line of data on the hectograph band 35d. Two previous envelopes 64 have had the data of a single line copied upon them. The operation of the mechanism during the return of the handle 46d to a substantially upright position will now be described and from it the previous operations will be readily understood, it being understood, of course, that the handle 46d is moved to a substantially upright position to raise the platen roller so that the second envelope 64 may be withdrawn from the carriage 49d. When the handle 46d is moved into its upright position, the lug 105d displaces the lever 106d so that it rotates the levers 111d in a clockwise direction (Fig. 21) against the action of the spring 119d and through a distance equal to the spacing of the teeth on the ratchet wheel 113f. It will be noted that the ratchet wheel 113f has three times as many teeth as the ratchet wheel 113e and the ratchet wheel 113d so that angular displacement of the ratchet wheel 113f a distance of one of its teeth will only displace the ratchet wheels 113e and 113d a distance equal to one-third of the distance between their teeth. However, as the third impression has been taken from a single line of data on the hectograph band 35d, it will be readily understood that the mechanism is arranged so that a tooth of the ratchet wheel 113e will displace the pawl 130d and a tooth of the ratchet wheel 113d will displace the pawl 210d. In other words, the two pawls will ride over the teeth with which they are shown in engagement in Figs. 24 and 25. During the taking of the first two impressions on the first two envelopes, the pawls 130d and 210d simply rest in one of the spaces between the teeth of the ratchet wheel 113e and between one of the spaces between the teeth of the ratchet wheel 113d, respectively. However, during the return of the handle 46d to its upright position after the taking of the third impression, the pawls 130d and 210d ride over the teeth of the ratchet wheels 113e and 113d, respectively. When the pawl 210d passes over a tooth of the ratchet wheel 113d, it pushes the lug 155d downwardly so that the lug 160d is lifted from engagement with the first slot or notch 99d from the left (Fig. 21) in the bar 95d. As the lug 160d leaves the notch or slot 99d, the tail piece 130e of the pawl 130d reaches the pin 136d and as the pawl 130d rides over the tooth it is engaging of the ratchet wheel 113e, the tail piece 130e displaces the pin 136d and the lever 137d in a clockwise direction (Fig. 21) around the pin 112d so that the nose 147d acting in the notch 97d will push the carriage 49d to the right (Fig. 21) a distance equal to the spacing between the notches or slots 99d whereupon the lug 160d will engage the second slot 99d from the left (Fig. 21) of the bar 95d. The mechanism is then in condition to resume its cycle of operations and to make three impressions of the following line of data on the hectograph band 35d. During the first movement of the lever 46d from its upright position to the position wherein it is shown in Fig. 21, the nose 147d will engage the first slot 99d from the left (Fig. 21) of the bar 95d so that it will be in position to urge the carriage to the right (Fig. 21) after the three impressions have been taken.

It will be noted that a spring 162d fixed to the bracket 120d has its free end abutting against the lever 146d so that the lever 146d is urged yieldingly in a counter-clockwise direction (Fig. 21).

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as permissible, in view of the prior art.

We claim:

1. In a duplicating machine, a frame, a bed plate, a carriage mounted for reciprocation over said bed plate, a platen roller for pressing copy sheets against a duplicating surface disposed over said bed plate, a lever pivotally mounted in said carriage and rotatably journalling said platen roller, said lever being adapted to be oscillated to bring said platen roller into and out of its functionally operative position, a toothed member on said frame, a plurality of levers carried by said carriage and engageable with the teeth of said toothed member, and means responsive to oscillations of the first-mentioned lever and cooperating with said plurality of levers for advancing said carriage in a step by step manner over said bed plate whereby an impression is taken of only a fragmentary portion of said duplicating surface on one copy sheet and an impression of only another fragmentary portion of said duplicating surface is taken on another copy sheet.

2. In a duplicating machine, a frame, a bed plate, a carriage mounted for reciprocation over said bed plate, a platen roller for pressing copy sheets against a duplicating surface disposed over said bed plate, a lever pivotally mounted in said carriage and rotatably journalling said platen roller, said lever being adapted to be oscillated to bring said platen roller into and out of its functionally operative position, a toothed member on said frame, a plurality of levers carried by said carriage and engageable with the teeth of said toothed member, and means co-operating with the first-mentioned lever and with said plurality of levers for advancing said carriage over said bed plate a predetermined distance each time the first-mentioned lever is displaced in a predetermined direction whereby an impression of only a fragmentary portion of the duplicating surface is taken on one copy sheet and an impression of only another fragmentary portion of said duplicating surface is taken on another copy sheet.

3. In a duplicating machine, a frame, a bed plate, a carriage mounted for reciprocation over said bed plate, a platen roller for pressing copy sheets against a duplicating surface disposed over said bed plate, a lever pivotally mounted in said carriage and rotatably journalling said platen roller, said lever being adapted to be oscillated to bring said platen roller into and out of its functionally operative position, a toothed member on said frame, a plurality of levers carried by said carriage and engageable with the teeth of said toothed member, and means co-operating with the first-mentioned lever and with said plurality of levers for advancing said carriage over said bed plate a predetermined distance each time the first-mentioned lever is displaced a plurality of times in a predetermined direction whereby only fragmentary impressions are taken on copy sheets from spaced portions of said duplicating surface, the fragmentary impressions taken on a plurality of copy sheets being identical and those taken on a plurality of succeeding copy sheets being identical with each other and different from those taken on the first-mentioned plurality of copy sheets.

4. In a duplicating machine, a frame, a bed plate, a carriage mounted for reciprocation over said bed plate, a platen roller for pressing copy sheets against a duplicating surface disposed over said bed plate, a member movably mounted in said carriage and rotatably journalling said platen roller, said member being adapted to bring said platen roller into and out of its functionally operative position, and means responsive to movement of said member relative to said carriage for advancing said carriage in a step by step manner over said bed plate whereby an impression of only a fragmentary portion of said duplicating surface is taken on one copy sheet and an impression of only another fragmentary portion of said duplicating surface is taken on another copy sheet.

5. In a duplicating machine, a frame, a bed plate, a platen roller for pressing copy sheets against a duplicating surface disposed over said bed plate, a member for rotatably journalling said platen and for bringing it into and out of its functionally operative position, and means responsive to movement of said member for advancing said platen roller in a step by step manner over said bed plate whereby an impression of only a fragmentary portion of said duplicating surface is taken on one copy sheet and an impression of only another fragmentary portion of said duplicating surface is taken on another copy sheet.

6. In a duplicating machine, a frame, a bed plate, means for pressing copy sheets against a duplicating surface disposed over said bed plate, a member for bringing said pressing means into and out of its functionally operative position, and means responsive to movement of said member for advancing said pressing means in a step by step manner over said bed plate whereby an impression of only a fragmentary portion of said duplicating surface is taken on one copy sheet and an impression of only another fragmentary portion of said duplicating surface is taken on another copy sheet.

7. In a duplicating machine having a duplicating surface to which copy sheets are applied to obtain copies therefrom, a platen member whereby a copy sheet may be pressed against only a fragmentary portion of said duplicating surface to obtain only a fragmentary copy of the matter that may be copied, and means responsive to movement of said platen member toward and away from said duplicating surface for advancing said platen member in a step by step manner along said duplicating surface whereby an impression is taken of only a fragmentary portion of said duplicating surface on one copy sheet and an impression of only another fragmentary portion of said duplicating surface is taken on another copy sheet.

8. In a duplicating machine having a duplicating surface to which copy sheets are applied to obtain copies therefrom, a platen member whereby a copy sheet may be pressed against only a fragmentary portion of said duplicating surface to obtain only a fragmentary copy of the matter that may be copied, and means responsive to movement of said platen member toward and away from said duplicating surface a plurality of times for advancing said platen member in a step by step manner along said duplicating surface whereby an impression is taken of only a fragmentary portion of said duplicating surface on a plurality of copy sheets and an impression of only another fragmentary portion of said duplicating surface is taken on a plurality of other copy sheets.

9. In a duplicating machine, a frame, a bed plate, a carriage mounted for reciprocation over said bed plate, a platen member for pressing copy sheets against a duplicating surface disposed over said bed plate, a lever pivotally mounted in said carriage and carrying said platen member, said lever being adapted to be oscillated to bring said platen member into and out of its functionally operative position, pawl and ratchet means carried by said carriage and actuated by said lever, a toothed member on said frame, and means actuated by said pawl and ratchet means and co-operating with said toothed member for advancing said carriage in a step by step manner over said bed plate whereby an impression is taken of only a fragmentary portion of said duplicating surface on one copy sheet and an impression of another fragmentary portion of said duplicating surface is taken on another copy sheet.

10. In a duplicating machine, a frame, a bed plate, a carriage mounted for reciprocation over said bed plate, a platen member for pressing copy sheets against a duplicating surface disposed over said bed plate, a lever pivotally mounted in said carriage and carrying said platen member, said lever being adapted to be oscillated to bring said platen member into and out of its functionally operative position wherein it is adapted to press a copy sheet against a fragmentary portion of the matter that may be duplicated from said duplicating surface, pawl and ratchet means carried by said carriage and actuated by said lever, and means co-operating with said toothed member and actuated by said pawl and ratchet means, each time said lever is oscillated a plurality of times, for advancing said carriage in a step by step manner over said bed plate whereby only fragmentary impressions are taken on the copy sheets from spaced portions of said duplicating surface, the fragmentary impressions taken on a plurality of copy sheets being identical and those taken on a plurality of succeeding copy sheets being identical with each other and different from those taken on the first-mentioned plurality of copy sheets.

11. In a duplicating machine, a frame, a bed plate, a carriage mounted for reciprocation over said bed plate, a platen roller for pressing copy sheets against a duplicating surface disposed over said bed plate, a lever pivotally mounted in said carriage and rotatably journalling said platen roller, said lever being adapted to be oscillated to bring said platen roller into and out of its functionally operative position, a toothed member on said frame, a plurality of levers carried by said carriage and engageable with the teeth of said toothed member, means responsive to oscillations of the first-mentioned lever and co-operating with said plurality of levers for advancing said carriage in a step by step manner over said bed plate whereby an impression is taken of only a fragmentary portion of said duplicating surface on one copy sheet and an impression of only another fragmentary portion of said duplicating surface is taken on another copy sheet, and means for holding said plurality of levers out of engagement with said toothed member whereby said carriage may be reciprocated to have said platen roller apply substantially the whole length of each copy sheet to the duplicating surface.

12. In a duplicating machine, a frame, a bed plate, a carriage mounted for reciprocation over said bed plate, a platen roller for pressing copy sheets against a duplicating surface disposed over said bed plate, a lever pivotally mounted in said carriage and rotatably journalling said platen roller, said lever being adapted to be oscillated to bring said platen roller into and out of its functionally operative position, a toothed member on said frame, a plurality of levers carried by said carriage and engageable with the teeth of said toothed member, means co-operating with the first-mentioned lever and with said plurality of levers for advancing said carriage over said bed plate a predetermined distance each time the first-mentioned lever is displaced in a predetermined direction whereby an impression of only a fragmentary portion of the duplicating surface is taken on one copy sheet and an impression of only another fragmentary portion of said duplicating surface is taken on another copy sheet, and means for holding said plurality of levers out of engagement with said toothed member whereby said carriage may be reciprocated to have said platen roller apply substantially the whole length of each copy sheet to the duplicating surface.

13. In a duplicating machine, a frame, a bed plate, a carriage mounted for reciprocation over said bed plate, a platen roller for pressing copy sheets against a duplicating surface disposed over said bed plate, a lever pivotally mounted in said carriage and rotatably journalling said platen roller, said lever being adapted to be oscillated to bring said platen roller into and out of its functionally operative position, a toothed member on said frame, a plurality of levers carried by said carriage and engageable with the teeth of said toothed member, means co-operating with the first-mentioned lever and with said plurality of levers for advancing said carriage over said bed plate a predetermined distance each time the first-mentioned lever is displaced a plurality of times in a predetermined direction whereby only fragmentary impressions are taken on copy sheets from spaced portions of said duplicating surface, the fragmentary impressions taken on a plurality of copy sheets being identical and those taken on a plurality of succeeding copy sheets being identical with each other and different from those taken on the first-mentioned plurality of copy sheets, and means for holding said plurality of levers out of engagement with said toothed member whereby said carriage may be reciprocated to have said platen roller apply substantially the whole length of each copy sheet to the duplicating surface.

14. In a duplicating machine having a duplicating surface to which copy sheets are applied to obtain copies therefrom, a platen member whereby a copy sheet may be pressed against only a fragmentary portion of said duplicating surface to obtain only a fragmentary copy of the matter that may be copied, means responsive to movement of said platen member toward and away from said duplicating surface for advancing said platen member in a step by step manner along said duplicating surface whereby an impression is taken of only a fragmentary portion of said duplicating surface on one copy sheet and an impression of only another fragmentary portion of said duplicating surface is taken on another copy sheet, a stop on said machine, and means operated by the stop for rendering said advancing means functionally inoperative whereby said platen member may be operated to apply substantially the full length of said copy sheet to the duplicating surface.

15. In a duplicating machine having a duplicating surface to which copy sheets are applied to obtain copies therefrom, a platen member whereby a copy sheet may be pressed against only a fragmentary portion of said duplicating surface to obtain only a fragmentary copy of the matter that may be copied, means responsive to movement of said platen member toward and away from said duplicating surface a plurality of times for advancing said platen member in a step by step manner along said duplicating surface whereby an impression is taken of only a fragmentary portion of said duplicating surface on a plurality of copy sheets and an impression of only another fragmentary portion of said duplicating surface is taken on a plurality of other copy sheets, a stop on said machine, and means operated by the stop for rendering said advancing means functionally inoperative whereby said platen member may be operated to apply substantially the full length of said copy sheet to the duplicating surface.

16. In a duplicating machine having a duplicating surface to which copy sheets are applied to obtain copies therefrom, a platen member whereby a copy sheet may be pressed against only a fragmentary portion of said duplicating surface to obtain only a fragmentary copy of the matter that may be copied, means responsive to movement of said platen member toward and away from said duplicating surface for advancing said platen member in a step by step manner along said duplicating surface whereby an impression is taken of only a fragmentary portion of said duplicating surface on one copy sheet and an impression of only another fragmentary portion of said duplicating surface is taken on another copy sheet, a stop on said machine, means operated by the stop for rendering said advancing means functionally inoperative whereby said platen member may be operated to apply substantially the full length of said copy sheet to the duplicating surface, and a second stop on said machine for causing said advancing means to become functionally operative.

17. In a duplicating machine having a duplicating surface to which copy sheets are applied to obtain copies therefrom, a platen member whereby a copy sheet may be pressed against only a fragmentary portion of said duplicating surface to obtain only a fragmentary copy of the matter that may be copied, means responsive to movement of said platen member toward and away from said duplicating surface a plurality of times for advancing said platen member in a step by step manner along said duplicating surface whereby an impression is taken of only a fragmentary portion of said duplicating surface on a plurality of copy sheets and an impression of only another fragmentary portion of said duplicating surface is taken on a plurality of other copy sheets, a stop on said machine, means operated by the stop for rendering said advancing means functionally inoperative whereby said platen member may be operated to apply substantially the full length of said copy sheet to the duplicating surface, and a second stop on said machine for causing said advancing means to become functionally operative.

18. In a duplicating machine, a frame, a bed plate, a carriage mounted for reciprocation over said bed plate, a platen roller for pressing copy sheets against a duplicating surface disposed over said bed plate, a lever pivotally mounted in said carriage and rotatably journalling said platen roller, said lever being adapted to be oscillated to bring said platen roller into and out of its functionally operative position, a toothed member on said frame, a plurality of levers carried by said carriage and engageable with the teeth of said toothed member, means co-operating with the first-mentioned lever and with said plurality of levers for advancing said carriage over said bed plate a predetermined distance each time the first-mentioned lever is displaced in a predetermined direction whereby an impression of only a fragmentary portion of the duplicating surface is taken on one copy sheet and an impression of only another fragmentary portion of said duplicating surface is taken on another copy sheet, a stop on said frame, and means carried by said carriage and actuated by said stop for holding said plurality of levers out of engagement with said toothed member whereby said carriage may be reciprocated to have said platen roller apply substantially the whole length of each copy sheet to the duplicating surface.

19. In a duplicating machine, a frame, a bed plate, a carriage mounted for reciprocation over said bed plate, a platen roller for pressing copy sheets against a duplicating surface disposed over said bed plate, a lever pivotally mounted in said carriage and rotatably journalling said platen roller, said lever being adapted to be oscillated to bring said platen roller into and out of its functionally operative position, a toothed member on said frame, a plurality of levers carried by said carriage and engageable with the teeth of said toothed member, means co-operating with the first-mentioned lever and with said plurality of levers for advancing said carriage over said bed plate a predetermined distance each time the first-mentioned lever is displaced a plurality of times in a predetermined direction whereby only fragmentary impressions are taken on copy sheets from spaced portions of said duplicating surface, the fragmentary impressions taken on a plurality of copy sheets being identical and those taken on a plurality of succeeding copy sheets being identical with each other and different from those taken on the first-mentioned plurality of copy sheets, a stop on said frame, and means carried by said carriage and actuated by said stop for holding said plurality of levers out of engagement with said toothed member whereby said carriage may be reciprocated to have said platen roller apply substantially the whole length of each copy sheet to the duplicating surface.

20. In a duplicating machine having a duplicating surface to which copy sheets are applied to obtain copies therefrom, a frame, a bed plate mounted in said frame, a carriage mounted for reciprocation over said bed plate, a platen member movably mounted in said carriage for pressing a copy sheet against said duplicating surface, and means responsive to movement of said platen member toward and away from said duplicating surface for advancing said carriage in a step by step manner along said duplicating surface.

ALFRED MARCHEV.
HUBERT JAGGER.